(12) United States Patent
Jang et al.

(10) Patent No.: US 11,457,374 B2
(45) Date of Patent: Sep. 27, 2022

(54) HUB DEVICE WITH DIAGNOSTIC FUNCTION AND DIAGNOSTIC METHOD USING THE SAME

(71) Applicant: LG ELECTRONICS INC., Seoul (KR)

(72) Inventors: Bongmun Jang, Seoul (KR); Koonseok Lee, Seoul (KR); Sangjin Park, Seoul (KR); Won-Chul Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 421 days.

(21) Appl. No.: 16/489,581

(22) PCT Filed: Mar. 15, 2019

(86) PCT No.: PCT/KR2019/003040
§ 371 (c)(1),
(2) Date: Aug. 28, 2019

(87) PCT Pub. No.: WO2020/189805
PCT Pub. Date: Sep. 24, 2020

(65) Prior Publication Data
US 2021/0368366 A1 Nov. 25, 2021

(51) Int. Cl.
*H04W 24/06* (2009.01)
*H04W 88/08* (2009.01)

(52) U.S. Cl.
CPC ............ *H04W 24/06* (2013.01); *H04W 88/08* (2013.01)

(58) Field of Classification Search
CPC ..... H04W 24/08; H04W 88/06; H04W 24/02; H04W 4/70; H04W 84/12; H04W 40/244; H04L 49/351; H04L 43/0817; H04L 49/602; H04L 41/022; H04L 43/18; H04L 27/14; H04L 67/12; H04L 27/0012; H04L 27/0008; H04L 27/22; H04L 27/00; H04L 5/005; H04B 7/04; H04B 1/0003
See application file for complete search history.

(56) References Cited

U.S. PATENT DOCUMENTS

2002/0073183 A1* 6/2002 Yoon .................. H04B 3/54
709/224
2004/0264365 A1 12/2004 Johnson et al.
(Continued)

FOREIGN PATENT DOCUMENTS

| KR | 1020140053654 | 5/2014 |
|---|---|---|
| KR | 1020150067288 | 6/2015 |

OTHER PUBLICATIONS

PCT International Application No. PCT/KR2019/003040, International Search Report dated Dec. 13, 2019, 3 pages.

*Primary Examiner* — Syed Ali
(74) *Attorney, Agent, or Firm* — Lee Hong Degerman Kang & Waimey

(57) ABSTRACT

A hub device providing a diagnostic function and a diagnostic method using the same are disclosed. The hub device includes: a communication unit receiving a first type of data from plural service devices to transmit the first type of data to an access point device and receiving a second type of data from the access point device to transmit the second type of data to at least one of the service devices; and a controller controlling the communication unit and performing diagnosis for the service devices and the access point device.

9 Claims, 7 Drawing Sheets

(56) References Cited

U.S. PATENT DOCUMENTS

| | | |
|---|---|---|
| 2009/0063670 A1 | 3/2009 | Crayford et al. |
| 2014/0119221 A1 | 5/2014 | Park et al. |
| 2014/0293801 A1* | 10/2014 | Dimou ............... H04W 4/70 |
| | | 370/252 |
| 2015/0295802 A1 | 10/2015 | Balakrishnan et al. |
| 2015/0382215 A1* | 12/2015 | Huang ............ H04W 24/08 |
| | | 370/252 |
| 2017/0339578 A1* | 11/2017 | Brommer ........... H04W 24/08 |
| 2019/0372833 A1* | 12/2019 | Kline ................ G06N 20/00 |
| 2020/0341529 A1* | 10/2020 | Kaipu Narahari ..... G05B 15/02 |
| 2020/0359189 A1* | 11/2020 | Yoon ................ H04W 4/029 |
| 2020/0374611 A1* | 11/2020 | Kim .................. H04R 1/021 |
| 2021/0019817 A1* | 1/2021 | Kang ................ G06Q 30/0641 |
| 2021/0067595 A1* | 3/2021 | Gum .................. H04L 67/12 |
| 2021/0127251 A1* | 4/2021 | Kang ................ H04W 24/10 |
| 2021/0233672 A1* | 7/2021 | Patil ................ H04L 9/0643 |
| 2022/0035617 A1* | 2/2022 | Elkady ................ H04W 4/70 |

\* cited by examiner

HUB DEVICE WITH DIAGNOSTIC FUNCTION AND DIAGNOSTIC METHOD USING THE SAME

CROSS-REFERENCE TO RELATED APPLICATIONS

This application is the National Stage filing under 35 U.S.C. 371 of International Application No. PCT/KR2019/003040, filed on Mar. 15, 2019, the contents of which are hereby incorporated by reference herein in its entirety.

TECHNICAL FIELD

The present invention relates to a hub device providing a diagnostic function and a diagnostic method using the same.

BACKGROUND ART

Recently, there are a number of stores that are provided with plural household appliances to provide services to users. Since such stores manage plural household appliances, integrated appliance management is required. In addition, there is a need for a technology for checking a failure or usage state of each appliance in an integrated management process.

Although production of household appliances having communication functions has increased, there is no integrated management device or method for actually managing such household appliances or checking conditions of the household appliances. As a result, a typical management device provides only a function of turning the appliances on/off.

Therefore, a method for integrated management of plural household appliances, which can perform maintenance/repair/diagnosis on the appliances, and an apparatus implementing the same are disclosed herein.

DISCLOSURE

Technical Problem

A purpose of the present disclosure is to solve such a problem in the art and the present disclosure provides an apparatus and method which can allow an operator of a store in which plural smart appliances are installed to check a malfunction of individual service devices or to check network connection.

This present disclosure provides a technique in which a hub device providing a diagnostic function is disposed in a store space in which plural service devices are installed, thereby improving diagnostic speed and accuracy for each device.

The objects of this invention are not limited to the above-mentioned objects, and the other objects and advantages of this invention which are not mentioned can be understood by the following description and more clearly understood based on the embodiments of this invention. It will also be readily seen that die objects and the advantages of this application may be realized by the means defined in the claims.

Technical Solution

In one embodiment of the present invention, a hub device providing a diagnostic function includes a communication unit communicating with plural service devices and an access point device; and a controller controlling the communication unit and performing diagnosis for the service devices and the access point device.

In one embodiment of the present invention, the hub device may perform first-section diagnosis to check communication state of the service devices and operation state of each of the service devices, and the hub device may perform second-section diagnosis to check communication state between the hub device and the access point device and operation state of the access point device after performing the first-section diagnosis.

In one embodiment, the hub device may select a service device that has never transmitted data or a service device that has higher data traffic than other service devices to perform the first-section diagnosis for the service device.

Advantageous Effects

According to embodiments of the invention, upon occurrence of problems such as malfunctions or a problem with a network such as disconnection of smart appliances or loss of network connection, a hub device can pinpoint where an error occurred through diagnosis on a section-by-section basis.

In addition, according to the embodiments of the invention, the hub device can ascertain a problem with the Internet, a problem with a router including an access point device, a problem with service devices including smart appliances, or a problem with an external server through diagnosis on a section-by-section basis.

It should be understood that the present invention is not limited to the effects described above and various other effects of the present invention can be easily conceived from the features of the present invention by those skilled in the art.

DETAILED DESCRIPTION

Figure 1:
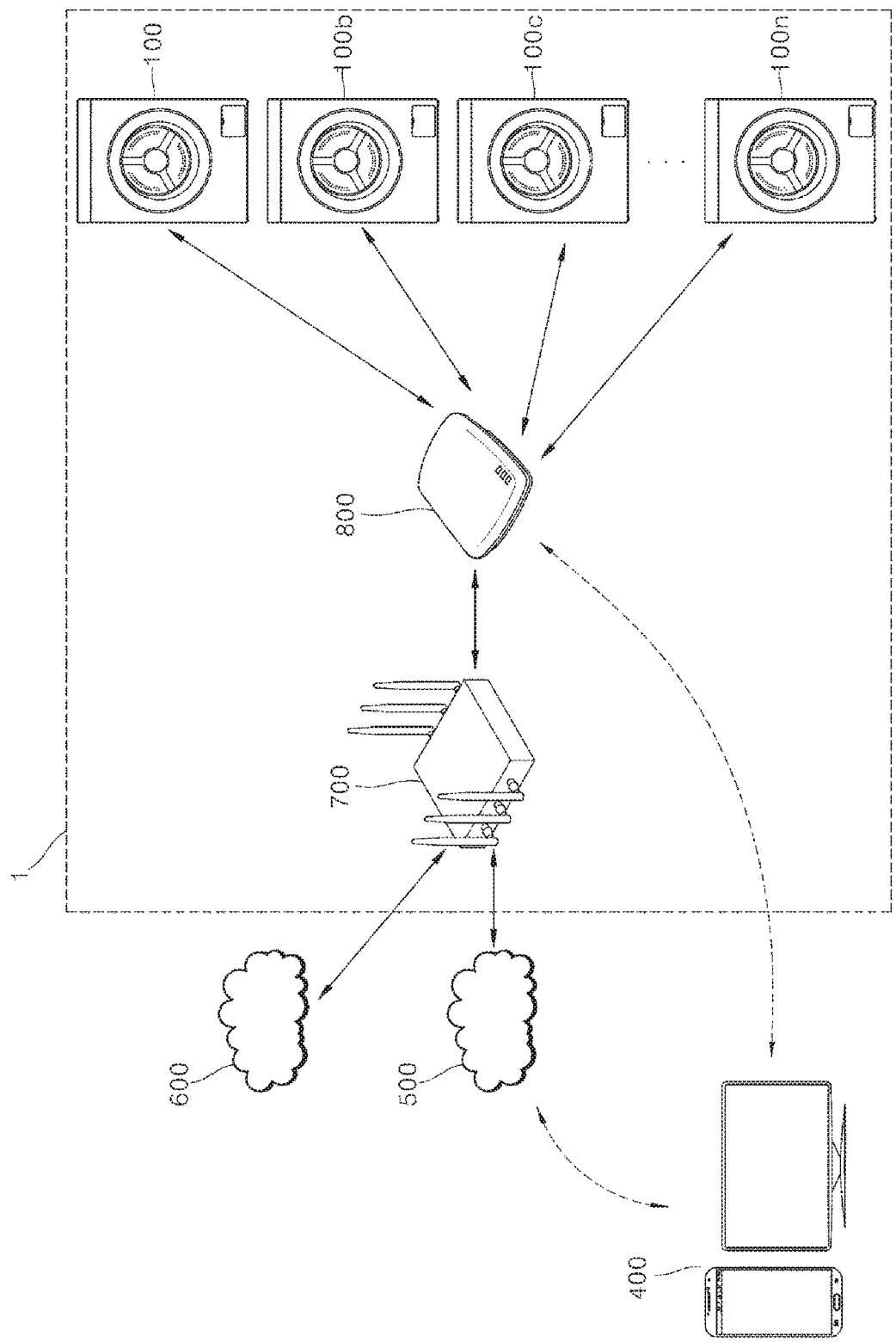
FIG. 1 is a diagram illustrating components of a system according to one embodiment of the present invention.

Hereinafter, embodiments of the present invention will be described with reference to the accompanying drawings such that the present invention can be easily implemented by those skilled in the art. It should be understood that the present invention may be embodied in different ways and is not limited to the following embodiments.

In the drawings, portions irrelevant to the description will be omitted for clarity. Like components will be denoted by like reference numerals throughout the specification. Further, some embodiments of the present invention will be described in detail with reference to the exemplary drawings. Here, like reference numerals are used to denote like elements even when the elements are shown in different drawings. Description of known functions and constructions which may unnecessarily obscure the subject matter of the present invention will be omitted.

It will be understood that, although the terms "first", "second", "A", "B", "(a)", "(b)", and the like may be used herein to describe various elements, components, regions, layers and/or sections, the nature, order, sequence, or number of these elements, components, regions, layers and/or sections should not be limited by these terms. These terms are only used to distinguish one element, component, region, layer or section from another element, component, region, layer or section. In addition, when an element or layer is referred to as being "on," "connected to," or "coupled to" another element or layer, it may be directly on, connected to, or coupled to the other element or layer or intervening elements or layers may be present.

It will be understood that, although components may be individually described in each embodiment of the present invention for convenience of explanation, these components may be implemented as one device or module, or one component may be commonly implemented in plural devices or modules.

As used herein, the term "service device" refers to one of plural household appliances installed in a store and each provided with a communication module. Providing a communication module means provided with a communication function. Examples of such a service device include washing machines, drying machines, clothes cleaning machines, and the like. In addition, examples of the service device also include computers, laptops, and the like.

In summary, the service device refers to one of a plurality of the same or similar types of home appliances disposed in a single store. Users may use such a plurality of service devices installed in the store.

FIG. 1 is a diagram illustrating components of a system according to one embodiment of the present invention.

A service device 100 has a communication function, for example, a wireless LAN communication function, such as Wi-Fi. However, it should be understood that the present invention is not limited thereto and the service device 100 may use various communication protocols. An access point device 700 and a hub device 800, which provide a communication function, may be selectively disposed in a store depending upon the type of communication protocols.

A plurality of service devices 100, 100a to 100n, the access point device 700, and the hub device 800 are disposed in the store 1. An operation management device 400 is disposed inside or outside the store to manage the service devices 100.

The service devices 100 receive control information from a server 500. The control information is generated by the operation management device 400 and is transmitted to the server 500. Each of the service devices 100 transmits state information to the server 500 during or after operation of the service device according to the control information.

The operation management device 400 monitors the service device 100 remotely or inside the store and generates the control information for controlling operation of the service device 100. The generated control information is transmitted to the service device 100 via the server 500.

The operation management device 400 allows a store operator to access the server 500 to remotely monitor or control the service devices 100 in the store. In one embodiment, the operation management device 400 may be a computer, a laptop, or the like. In addition, the operation management device 400 may register an account for the store or information on the service devices 100. Further, the operation management device 400 may ascertain results of network maintenance/repair/diagnosis on the service devices 100 in the store.

The hub device 800 allows the service devices 100 to conveniently communicate with the server 500 using a communication protocol. The hub device 800 communicates with each service device 100 using a wireless communication protocol (for example, Wi-Fi). Since the hub device 800 functions as a Wi-Fi access point, the service devices 100 can be connected to the Internet via the hub device 800.

The hub device 800 and the access point device 700 may be connected to each other via wired LAN (Ethernet) to communicate with each other using a wired communication protocol. Alternatively, the hub device 800 may communicate with the access point device 700 using a wireless communication protocol (for example, Wi-Fi).

The service device 100 may be connected to the access point device 700 or the hub device 800 in the store using a communication protocol. However, it should be understood that the service device 100 needs to maintain connection to the hub device 800 for a certain period of time in order to secure effective diagnosis of the service device 100.

The server 500 receives the control information from the operation management device 400 and transmits the control information to the service device 100. In addition, the server 500 receives the state information on the service device 100 from the service device 100 and transmits the state information to the operation management device 400.

More specifically, the server 500 stores information on the store and the service device 100 and updates the information. The operation management device 400 may access the server 500 to ascertain the information on the store or to check conditions of the service device 100, and the server 500 may provide a web page or the like. In addition, the server 500 stores information necessary for the operation management device 400 to monitor/control the service devices 100 in the store.

According to the embodiment shown in FIG. 1, an operator inside or outside a store can check conditions of the service devices in the store at anytime using the operation management device 400. In addition, the operation management device 400 can remotely perform diagnosis on the service devices in the store to perform maintenance/repair tasks.

In particular, according to the embodiment shown in FIG. 1, since each of the service devices 100 is connected to the hub device 800, maintenance/repair tasks and diagnostic tasks for checking network connection of the service devices 100 or for eliminating network errors can be facilitated.

An external server 600 is a server that communicates a certain type of information with the service device 100 without directly controlling the service device 100.

As shown in FIG. 1, the hub device 800 may communicate with the service devices 100, i.e. smart appliances installed in the store and each having a communication function. Since the hub device 800 provides a dedicated Wi-Fi connection function to the service devices 100, the operation management device 400 can use the hub device 800 to maintain/repair the service devices 100.

That is, the hub device 800 exclusively provides a function of network maintenance/repair/diagnosis on the service devices 100 connected thereto. In the embodiment shown in FIG. 1, the operation management device 400 may control the service devices 100 via the server 500 or by being directly connected to the hub device 800.

For this purpose, a network shown in FIG. 1 may be divided into several sections with respect to the hub device 800, and thus the operation management device 400 may check the condition and communication state of each of the service devices 100 on a section-by-section basis.

Figure 2:
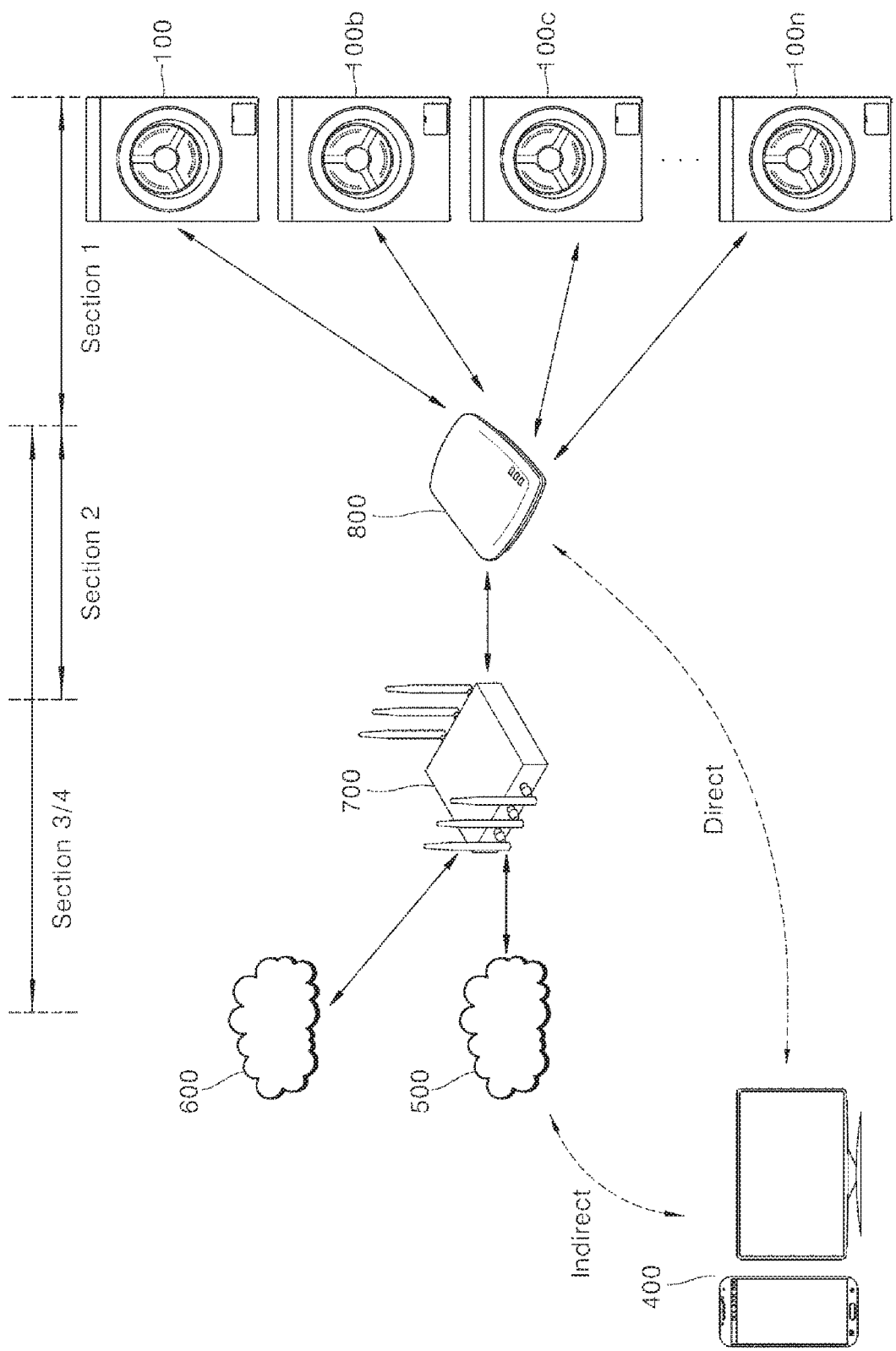
FIG. 2 is a diagram illustrating diagnostic sections according to one embodiment of the present invention.

FIG. 2 is a diagram illustrating diagnostic sections according to one embodiment of the present invention. Specifically, FIG. 2 shows a network connection of the service devices 100, wherein the network connection is divided into several sections.

A first section (Section 1 or a first diagnostic section) or a hub-service device section is a section in which the operation management device 400 performs diagnosis to check network connection between each service device 100 and the hub device 800 and whether these two devices are operating normally.

A second section (Section 2 or a second diagnostic section) or a hub-AP section is a section in which the operation management device 400 performs diagnosis to check network connection between the hub device 800 and the access point device 700 and whether these two devices are operating normally.

In one embodiment, third/fourth sections (Sections 3, 4 or third/fourth diagnostic sections) or a hub-Internet section is a section in which the operation management device 400 performs diagnosis to check network connection between the hub device 800 and the Internet or between the hub device 800 and the server 500 and whether these devices are operating normally.

Although not shown in the drawings, in another embodiment, the third/fourth sections are sections in which the operation management device 400 performs diagnosis to check network connection between the access point device 700 and the Internet or between the access point device 700 and the server 500 and whether these devices are operating normally, excluding diagnosis of the hub device 800.

The operation management device 400 may use all the state information ascertained in the first and second sections to perform various diagnostic tasks required in the store.

In addition, the operation management device 400 may employ an indirect diagnostic method through the server 500 or a direct diagnostic method through the hub device 800. In the indirect diagnostic method, the operation management device 400 ascertains diagnosis results through the server 500. In the direct diagnosis, the operation management device 400 ascertains diagnosis results through the hub device 800.

Figure 3:
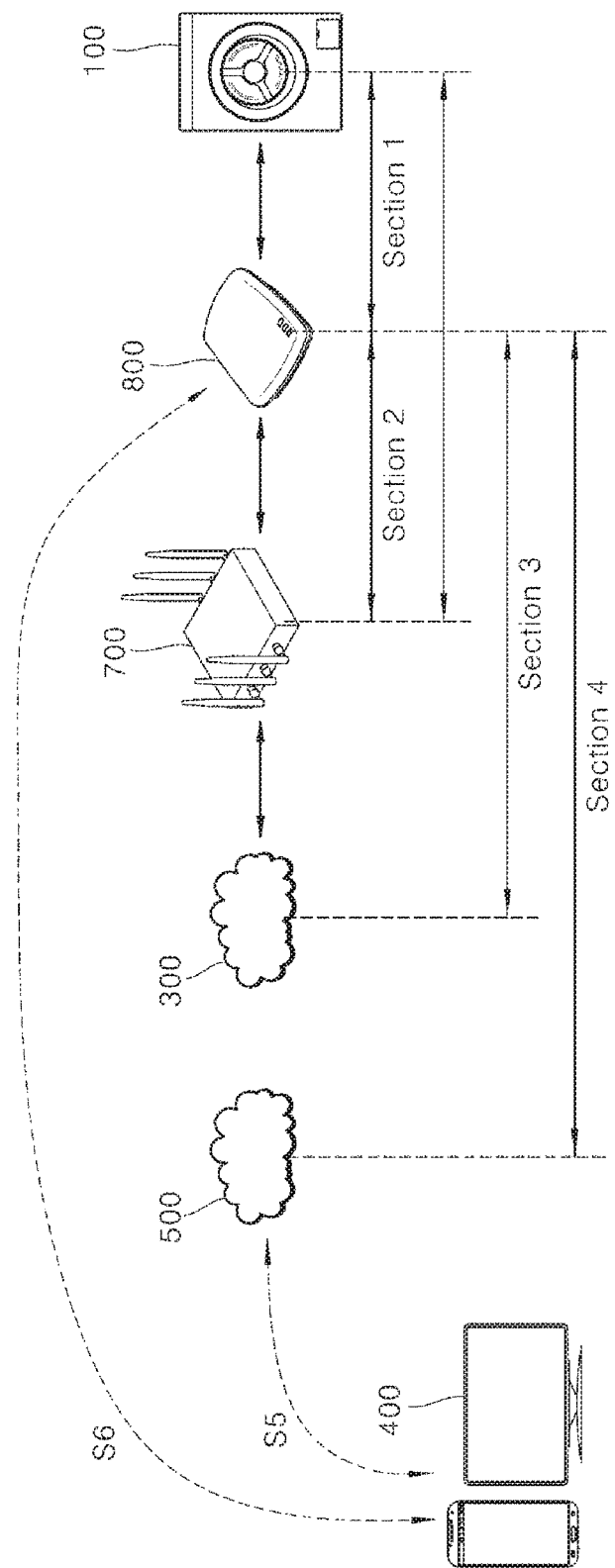
FIG. 3 is a diagram illustrating a diagnosis process in each diagnostic section according to one embodiment of the present invention.

FIG. 3 is a diagram illustrating a diagnosis process in each diagnostic section according to one embodiment of the present invention.

Here, diagnosis on a section-by-section basis may be divided into a diagnosis process under control of the server 500 and a diagnosis process under control of the operation management device 400.

The operation management device 400 or the server 500 may check the first section (Section 1). The operation management device 400 or the server 500 may check communication state between the hub device 800 and each of the service devices 100 and normal operation state of these two devices 100, 800 by checking the first section.

The operation management device 400 or the server 500 may check the second section (Section 2). The operation management device 400 or the server 500 may check communication state between the hub device 800 and the access point device 700 and normal operation state of these two devices 700, 800.

The operation management device 400 or the server 500 may check the third section (Section 3). The operation management device 400 or the server 500 may check communication state between the hub device 800 and the Internet 300 and whether the hub device 800 is normally operating with the Internet by checking the third section.

The operation management device 400 or the server 500 may check the fourth section (Section 4). The operation management device 400 or the server 500 may check communication state between the hub device 800 and the server 500 and normal operation state of these two devices 800, 500 by checking the fourth section.

The operation management device 400 or the server 500 may determine which part of the network connected to the service devices 100 has a problem by checking the first to fourth sections.

If the aforementioned diagnosis process (the first-section diagnosis to the fourth-section diagnosis) is performed by the server 500, diagnosis results are stored in the server 500. Then, the server 500 transmits the diagnosis results to the operation management device 400 in response to a request (S5) of the operation management device 400.

If the diagnosis process (the first-section diagnosis to the fourth-section diagnosis) is performed by the operation management device 400, the operation management device 400 may directly ascertain results of checking communication state between the hub device 800 and the other devices 100, 700, 300, 500 and normal operation state of the devices 100, 700, 300, 500 through the hub device 800 (S6).

According to the embodiment shown in FIG. 3, in the first-section diagnosis or the second-section diagnosis, the hub device 800 may perform diagnosis on devices other than the service devices 100. For example, if a card payment device is connected to the hub device 800, information on communication between the hub device 800 and the card payment device may be transmitted to the operation management device 400 directly (S6) or indirectly (S5).

Similarly, if a card payment device is connected to the access point device 700, information on communication between the access point device 700 and the card payment device may be transmitted to the operation management device 400 directly (S6) or indirectly (S5).

Figure 4:
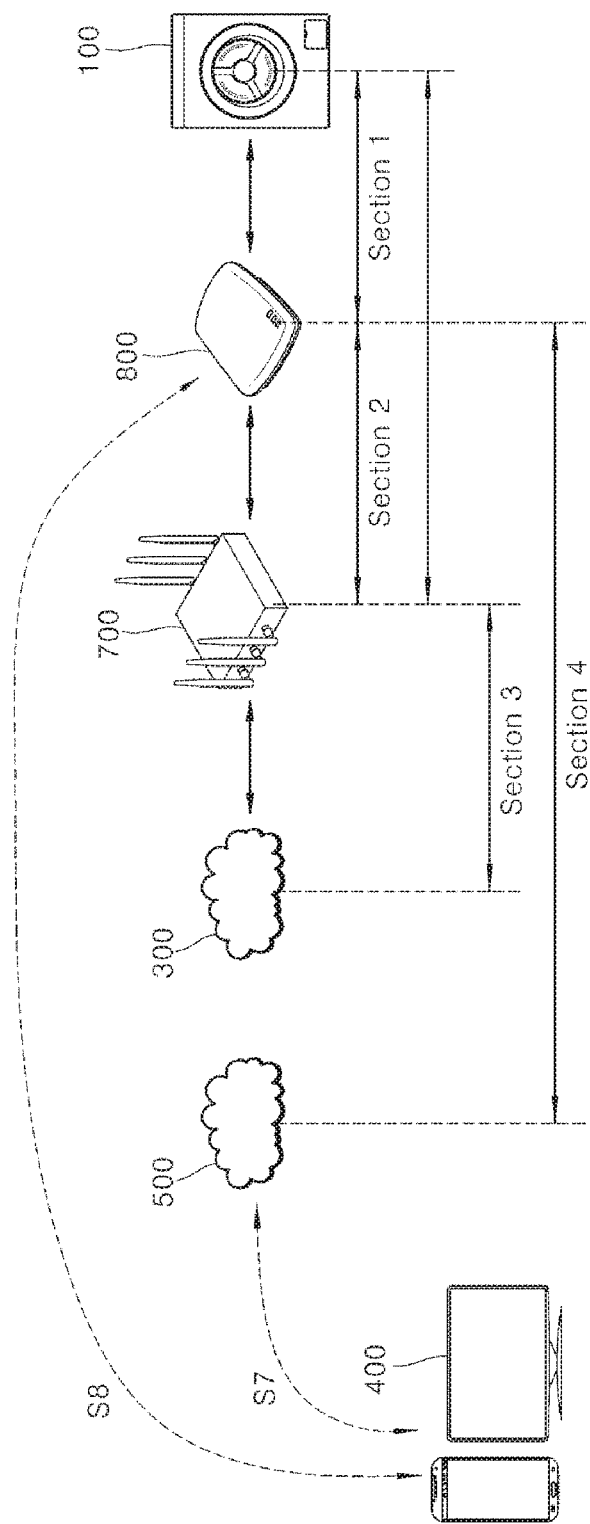
FIG. 4 is a diagram illustrating a diagnosis process in each diagnostic section according to another embodiment of the present invention.

FIG. 4 is a diagram illustrating a diagnosis process in each diagnostic section according to another embodiment of the present invention. In this embodiment, a first section, a second section, and a fourth section are the same as those in the embodiment shown in FIG. 3. However, in a third section (Section 3a), the operation management device 400 or the server 500 checks communication state between the access point device 700 and the Internet 300 and operation state of the access point device 700, unlike in the embodiment shown in FIG. 3.

Figure 5:
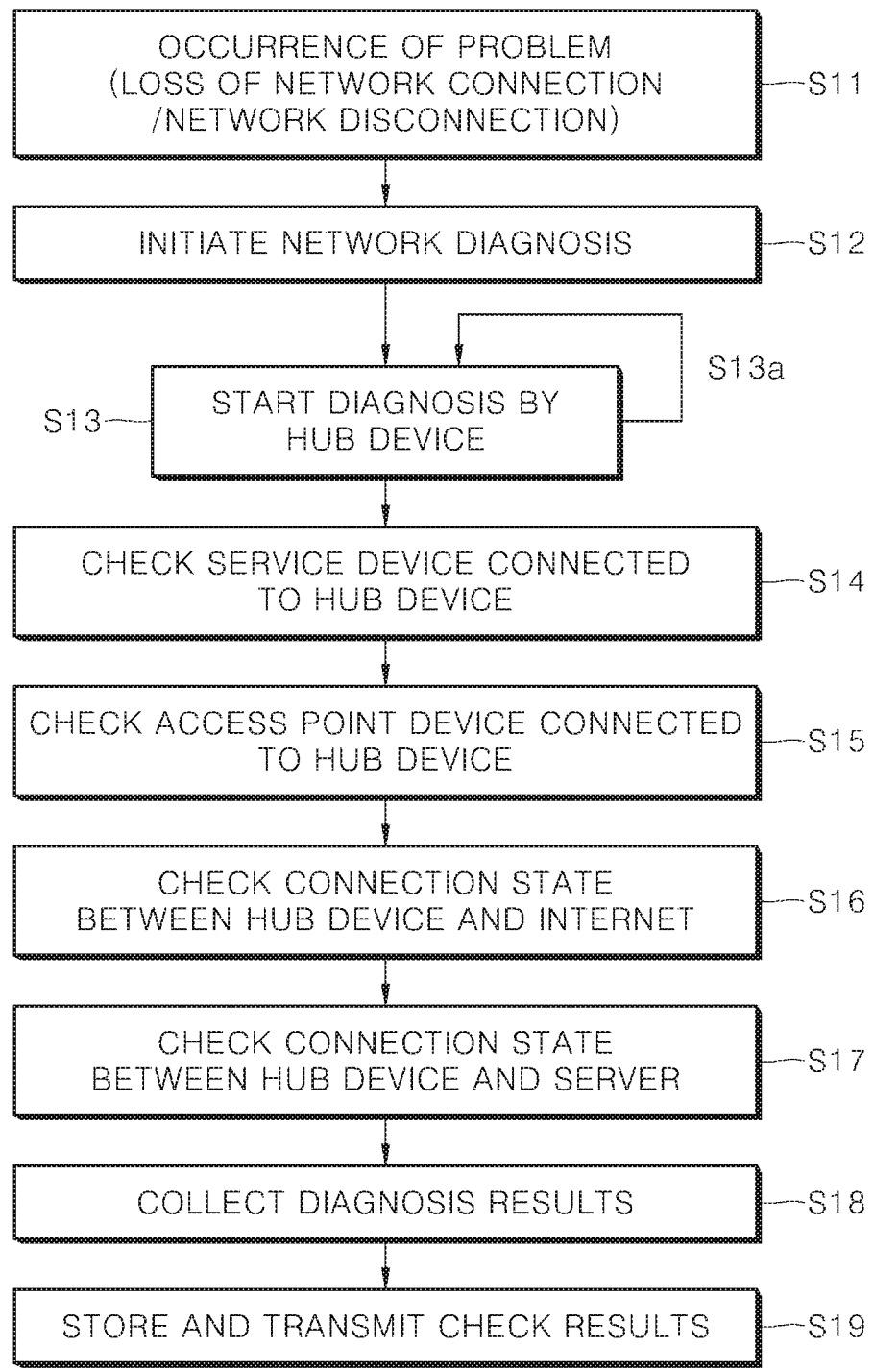
FIG. 5 is a flowchart showing a process of performing diagnosis on a section-by-section basis according to one embodiment of the present invention.

FIG. 5 is a flowchart showing a process of performing diagnosis on a section-by-section basis according to one embodiment of the present invention. In this embodiment, reference will also be made to FIG. 1 to FIG. 4. The server 500 or the operation management device 400 ascertains that an abnormality has occurred in any of the plural service devices 100 installed in a store space 1.

Herein, the abnormality may include, for example, a phenomenon that the service devices 100 are unable to operate properly due to problems, such as loss of network connection or network disconnection (S11). The server 500 or the operation management device 400 initiates network diagnosis (S12). The server 500 or the operation management device 400 instructs the hub device 800 to start diagnosis (S13). In another embodiment, the hub device 800 may automatically start diagnosis on a periodic base (S13a).

The hub device 800 starts diagnosis on conditions of the service devices connected thereto (S14). This diagnosis step includes the first-section diagnosis. This will be described more in detail with reference to FIG. 6

Next, the hub device 800 starts diagnosis on conditions of the access point device 700 connected thereto (S15). This diagnosis step includes the second-section diagnosis. This will be described more in detail with reference to FIG. 7.

Next, the hub device 800 starts diagnosis on connection state with the Internet 300 (S16). This diagnosis step includes the third-section diagnosis. In this diagnosis step, it is ascertained whether the hub device 800 is able to communicate with an external third server via the Internet 300. For example, the hub device 800 may check whether the Internet 300 is operating normally by transmitting a packet such as PING to the third server (third party server), which is open to public, via the Internet 300 and receiving results thereof.

Next, the hub device 800 starts diagnosis on conditions of the server 500 connected thereto (S17). This diagnosis step will be described more in detail with reference to FIG. 8.

Next, the hub device 800 collects the diagnosis results obtained in steps S14 to S17 (S18). In this process, the hub device 800 may analyze other network environments. Then, the hub device 800 stores the diagnosis results and transmits the diagnosis results to the operation management device 400 or the server 500. The operation management device 400 may ascertain the diagnosis results for each section directly or via the server 500.

Figure 6:
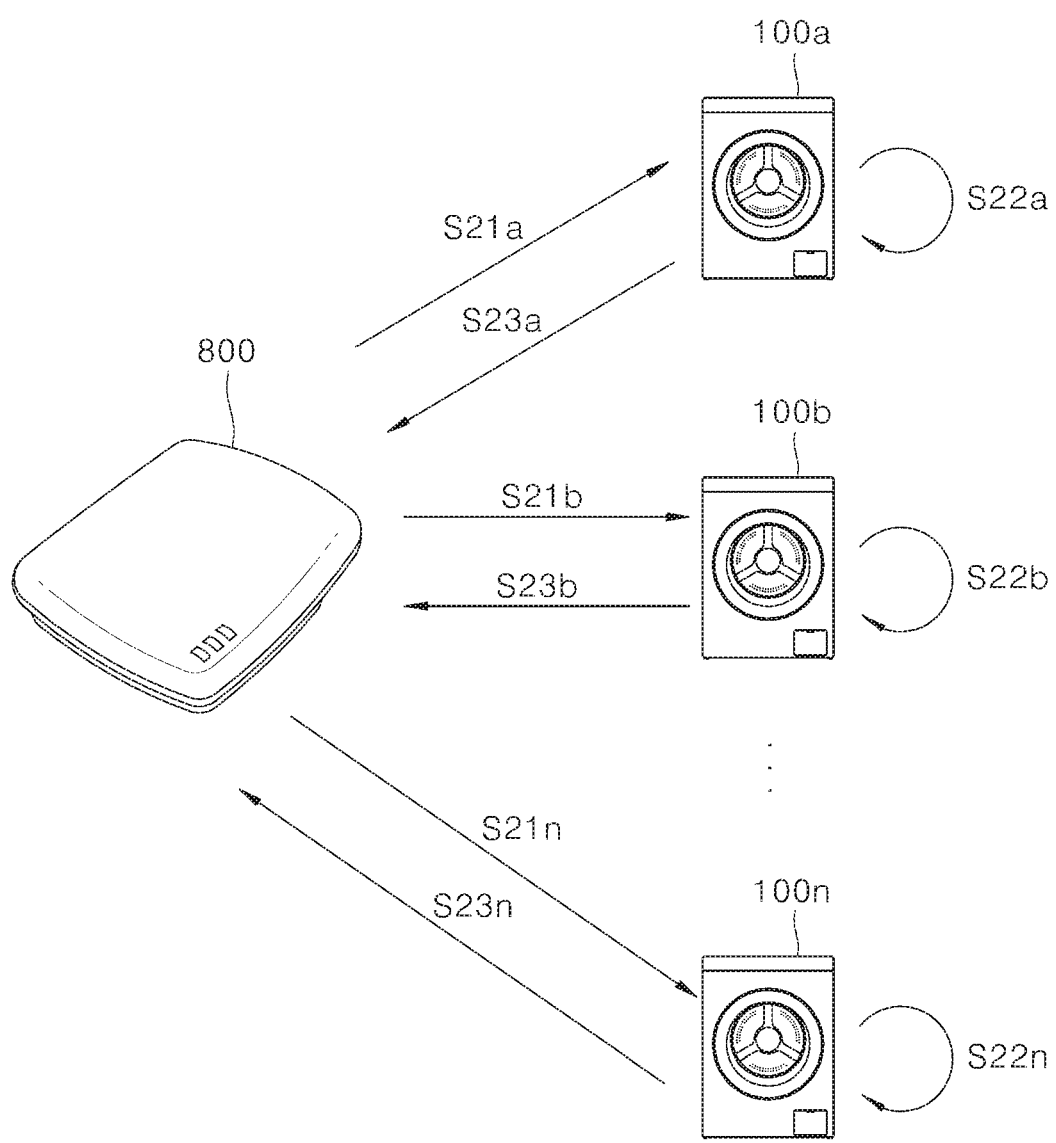
FIG. 6 is a diagram illustrating a diagnosis process between a hub device and service devices according to one embodiment of the present invention.

FIG. 6 is a diagram illustrating a diagnosis process between a hub device and service devices according to one embodiment of the present invention. FIG. 6 shows Step S14 of FIG. 5 in detail.

The hub device 800 checks conditions of the service devices 100a, 100b, . . . , 100n connected thereto. First, the hub device 800 checks communication with each of the service devices 100a, 100b, . . . , 100n (S21a). The hub device 800 transmits a pre-arranged packet to each of the service devices 100a, 100b, . . . , 100n (S21a, S21b, S21n), and each of the service devices 100a, 100b, . . . , 100n processes the received packet (S22a, S22b, S22n), and each of the service devices 100a, 100b, . . . , 100n transmits a response including the processing result to the hub device 800 (S23a, S23b, S23n).

Here, the response including the processing results may include current operation state of each of the service devices 100a, 100b, . . . , 100n. Thus, the response includes communication state between the hub device 800 and each of the service devices 100a, 100b, . . . , 100n and the operation state of each of the service devices 100a, 100b, . . . , 100n.

The hub device 800 collects the responses (S18 of FIG. 5). The hub device 800 transmits the collected information to the server 500 or the operation management device 400 (S19 of FIG. 5).

Figure 7:
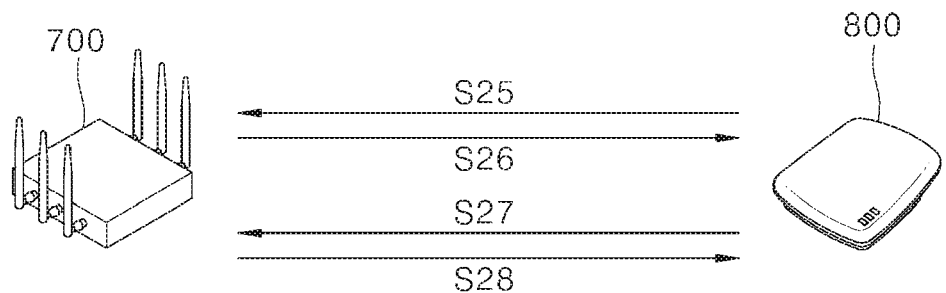
FIG. 7 is a diagram illustrating a diagnosis process between a hub device and an access point device according to one embodiment of the present invention.

FIG. 7 is a diagram illustrating a diagnosis process between a hub device and an access point device according to one embodiment of the present invention. FIG. 7 shows Step S15 of FIG. 5 in detail. The hub device 800 checks a physical link between the hub device and the access point device 700 (S25).

For example, the hub device 800 checks whether the access point 700 is turned on or whether a communication line is connected between the hub device 800 and the access point device 700 (S26). Steps S25, S26 may be performed by applying a signal, such as 1 or 0, to a communication line connected between the hub device 800 and the access point device 700 through a physical layer and checking whether the hub device 800 receives physical feedback on the signal from the access point device 700.

When the hub device 800 ascertains that the physical link is operating normally, the hub device 800 checks communication state with the access point device 700 to ascertain whether communication with the access point device 700 is established (S27, S28). The hub device 800 transmits pre-arranged packets to the access point device 700 (S27). The access point device 700 transmits responses to reception of the packets to the hub device 800 (S28).

The hub device 800 collects the received responses (S18 of FIG. 5). The hub device 800 transmits the collected information to the server 500 or the operation management device 400 (S19 of FIG. 5).

Figure 8:
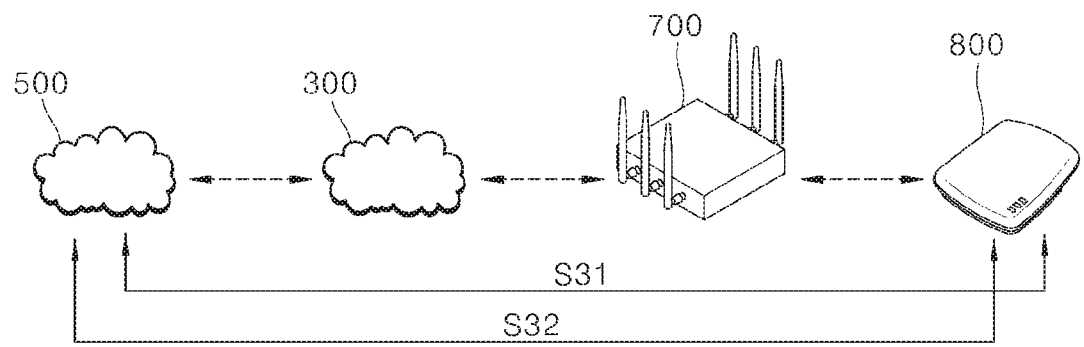
FIG. 8 is a diagram illustrating a process in which a hub device checks connection to a server via an access point device and the Internet according to one embodiment of the present invention.

FIG. 8 is a diagram illustrating a process in which a hub device 800 checks connection to a server via an access point device 700 and the Internet 300 according to one embodiment of the present invention. If the hub device 800 ascertains that the access point device 700 and the Internet 300 are operating normally based on results of checking connection to the access point device 700 and the Internet 300 in steps S15 and S16 of FIG. 5, the hub device 800 checks connection state to the server 500 (S17).

The hub device 800 checks whether communication with the server 500 is possible to ascertain communication state therebetween (S31). For this purpose, the hub device 800 may transmit a pre-arranged packet to the server 500 and receive a response thereto from the server 500 (S31). When ascertaining that communication with the server 500 is possible, the hub device 800 collects information on connection with a module (program or software) that is installed in the server to transmit/receive data to/from the hub device 800 (S32).

The hub device 800 or the server 500 may collect the information based on comparison between data transmitted to the server 500 from the hub device 800 and data stored in the server 500. Similarly, the hub device 800 or the server 500 may collect the information based on comparison between data transmitted to the hub device 800 from the server 500 and data stored in the hub device 800.

The information on connection includes information for ascertaining whether data transmission between the server 500 and the hub device 800 has been properly achieved.

The operation management device 400 may ascertain conditions of the network and each of the aforementioned devices based on the information collected in the hub device 800 or the server 500 in the processes shown in FIG. 5 to FIG. 8, Table 1 shows results of ascertaining, by the operation management device 400, diagnostic state in each of the diagnostic sections and diagnosing errors. In Table 1, a diagnosis result for diagnostic section 3 is omitted since an error in section 3 was due to a problem with the network itself. In generation of the diagnosis results on a sectionby-section basis by the operation management device 400, a diagnostic section in which no error occurred was rated as (O), a diagnostic section in which error occurred was rated as (X), and a diagnostic section in which it was impossible to determine occurrence of error was rated as (Δ).

TABLE 1

| Diagnostic section 1 (diagnosis for service device) | Diagnostic section 1&2 (diagnosis for hub device) | Diagnostic section 2 (diagnosis for AP) | Diagnostic section 4 (diagnosis for server) | Diagnosis result |
|---|---|---|---|---|
| x | o | o | o | Problem with service device |
| o | x | — | — | Problem with hub device itself |
| o | o | x | — | Problem with connection between AP and Internet |
| o | o | o | x | Problem with server |
| Δ | o | o | o | Problem with service device |
| o | o | o | Δ | Problem with server |

The hub device 800 may perform diagnosis in different manners for the respective diagnostic sections. For example, the hub device 800 may perform the first-section diagnosis every hour. On the other hand, the hub device 800 may perform the second-section diagnosis every day. In addition, the hub device 800 may perform the third or fourth-section diagnosis every third day.

In addition, the hub device 800 may store the number of diagnostic tasks for the first section or results of the diagnostic tasks, and if problems occurring in the first section have been resolved, the hub device 800 may provide only a final diagnosis result to the operation management device 400 or the server 500. Alternatively, the hub device 800 may also provide an intermediate diagnosis result to the operation management device 400 or the server 500 even when problems occurring in the section have been resolved after storing the number of diagnostic tasks for the first section or results of the diagnostic tasks.

The hub device 800 may transmit diagnosis results based on past error occurrence records of the service devices 100. The hub device 800 may distinguish a service device in which error has occurred frequently from a service device in which an error has never occurred so as to impart different degrees of urgency to respective emergency messages indicating error occurrence.

In addition, the hub device 800 may retain diagnosis results for the first section and the second section, and when the hub device 800 receives an instruction to perform diagnosis, and the if there is no significant difference between the time of performing diagnosis for the first/second sections and the time of receiving the instruction, the hub device 800 may perform diagnosis for the third and fourth sections first.

That is, although the hub device 800 may perform the first-section diagnosis, the second-section diagnosis, the third-section diagnosis, and the fourth-section diagnosis in the stated order, for rapid diagnosis, the hub device 800 may perform the third-section diagnosis and fourth-section diagnosis first if the latest diagnosis results for the first and second sections are confirmed to be normal. For example, when the operation management device 400 directly accesses the hub device 800 and instructs the hub device to perform diagnosis, the hub device 800 may perform the third-section diagnosis and the fourth-section diagnosis first, if the diagnosis results for the first and second sections one hour or less ago are confirmed to be normal.

Another embodiment may be applied when the hub device 800 stores diagnosis results for the third and fourth sections and the operation management device 400 directly accesses the hub device 800 in a short time (for example, in 1 hour) after completion of diagnosis for the third and fourth sections to instruct the hub device 800 to perform diagnosis. That is, if diagnosis results for the third and fourth sections one hour or less ago are confirmed to be normal, the hub device 800 may complete diagnosis by performing first-section diagnosis and the second-section diagnosis.

Figure 9:
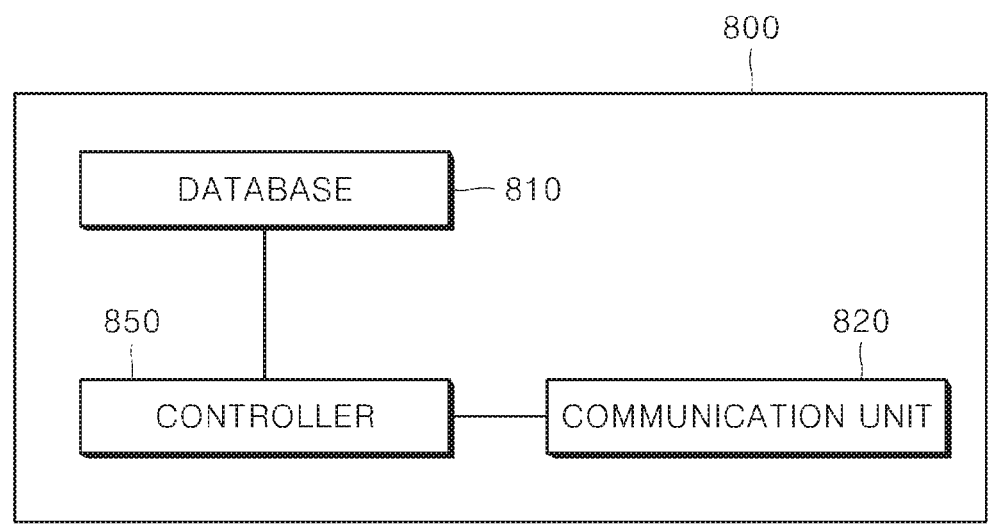
FIG. 9 is a schematic block diagram of a hub device according to one embodiment of the present invention.

FIG. 9 is a schematic block diagram of a hub device according to one embodiment of the present invention. A communication unit 820 of the hub device 800 communicates with various devices. The communication unit 820 receives a first type of data from plural service devices 100 and transmits the first type of data to the access point device 700. In addition, the communication unit 820 receives a second type of data from the access point device 700 and transmits the second type of data to one or more of the service devices 100.

A database 810 cumulatively stores data transmitted between the service device 100 and the access point device 700 for a certain period of time. As a result, when the service device 100 is temporarily unable to communicate, data received from the access point device 700 is temporarily stored in the database 810.

A controller 850 controls the communication unit 820 and the database 810. Then, the controller 850 performs diagnosis for the service device 100 and the access point device 700.

In addition, the communication unit 820 communicates with the operation management device managing the service devices, as indicated by DIRECT of FIG. 2 or as in Step S6 of FIG. 3 and Step S8 of FIG. 4. Then, the controller 850 performs diagnosis for the service devices and the access point device in response to an instruction of the operation management device to generate diagnosis results. The controller 850 may temporarily store the generated diagnosis results in the database 810.

Then, the communication unit 820 transmits the diagnosis results to the operation management device.

The communication unit 820 indirectly communicates with the operation management device managing the service devices, as indicated by INDIRECT of FIG. 2 or as in Step S5 of FIG. 3 and Step S7 of FIG. 4.

The communication unit 820 communicates with the server 500 via the access point device. The controller 850 performs diagnoses for the service devices and the access point device in response to an instruction from the server 500 to generate diagnosis results. The controller 850 may temporarily store the generated diagnosis results in the database 810.

Then, the communication unit 820 transmits the diagnosis results to the server 500.

In addition, the hub device 800 may increase diagnostic speed and accuracy by sequentially performing diagnosis. That is, the controller 850 performs the first-section diagnosis to check communication between the hub device and each service device and operation of each device and then performs second-section diagnosis to check communication between the hub device and the access point device and operation of the access point device.

Since the service devices frequently suffer from a malfunction or a bad connection and it is difficult to determine occurrence of such a problem, it is desirable that the hub device 800 perform diagnosis for the service devices prior to performing diagnosis for the access point device in order to generate diagnosis results quickly. In particular, the hub device 800 may repeatedly perform diagnosis only for the service devices on a predetermined schedule. As a result, errors occurring in the service devices can be diagnosed in a short time, whereby the hub device 800 can quickly transmit diagnosis results to the operation management device 400 or the server 500.

In addition, the hub device 800 may perform preliminary diagnosis upon ascertaining abnormal operations of the service devices, in addition to diagnosis on the predetermined schedule. For example, the controller 850 may select a service device that has never transmitted data or a service device that has higher data traffic than the other service devices to perform the first-section diagnosis.

Further, the hub device 800 stores information on a service device that is confirmed to have failed in the database 810. Then, the hub device 800 may repeatedly perform diagnosis for the corresponding service device at short time intervals to prevent recurrence of error.

The controller 850 stores a part of data exchanged with specific service devices in the database 810. The controller 850 periodically retrieves information from the database 810. When retrieval results show that a specific service device did not transmit/receive data over a certain period of time (for example, 3 hours, half a day, or the like), the controller 850 determines that the corresponding service device is likely to have been powered off or to have a problem.

Then, the controller 850 may perform the first-section diagnosis only for the corresponding service device to check whether the service device is operating properly. According to this embodiment, the hub device 800 can provide a remote monitoring function to an operator of an unattended store.

Similarly, the controller 850 identifies a service device that has excessively high or significantly increased data traffic, as compared with that of the other service devices. In this case, the controller 850 determines that the corresponding service device is likely to have malfunctioned. Then, the controller 850 may perform the first-section diagnosis only for the corresponding service device to check whether the service device is operating properly.

If results of the first-section diagnosis show that a specific device has an abnormality in operation or communication, the controller 850 generates a message instructing the corresponding service device to stop operation. Then, the communication unit 820 transmits the message to the service device. Then, the service device temporarily stops operation until the abnormality is resolved.

In addition, upon receiving the message instructing to stop operation, the service device may output the message on an interface thereof. For example, for a washing machine or a drying machine, a display unit thereof, which serves to display completion of a task and the like, may continuously flash on/off or output a sound through a speaker to indicate cessation of operation. In this way, a service device manager in a store space can quickly check the corresponding service device.

If plural service devices are installed in the store, as shown in FIG. 1, the corresponding service device may output a notice "temporary shutdown" to guide a service user to use another service device.

In addition, the hub device 800 may check connection to the Internet. First, the controller 850 performs the third-section diagnosis to check connection to an external public server and the Internet via the access point device. Here, the term "external public server" refers to a server that is open to public, such as Google and Naver, and the hub device 800 may try to access the external public server or transmit a message such as PING to the external public server so as to confirm whether the hub device 800 is properly connected to the Internet 300.

In addition, the controller 850 performs the fourth-section diagnosis to check communication between the hub device and the server 500 via the access point device and operation of the server 500. In this way, through communication between the server 500 and the hub device 800 in a pre-arranged manner, the hub device 800 can ascertain whether communication with the server is properly established and whether the server 500 is operating properly.

In particular, when the operation management device 400 directly communicates with the hub device 800 (DIRECT, S6, S8), as described with reference to FIG. 2, FIG. 3 and FIG. 4, the operation management device can control the service devices 100 via the hub device 800 even when there is a problem with the server 500.

Accordingly, the hub device 800 stores an error situation of the server 500, ascertained in the diagnosis process, in the database 810 and provides the operation management device 400 with the time error occurred, what kinds of errors occurred, and the like.

The embodiments of the invention are summarized as follows: The hub device 800 performs diagnosis for the first to fourth sections in response to an instruction of the server 500 or the operation management device 400, based on determination by the hub device 800 itself (detection of an error in the service device or the access point device), or on a predetermined time schedule. The hub device 800 stores diagnosis results and provides the stored diagnosis results to the server 500 or the operation management device 400.

According to the embodiments of the invention, a service device, for example, a smart appliance, is communicatively connected to the access point 700 via the hub device 800 using Wi-Fi. The hub device 800 can determine a problem with network communication or operational errors of each device on a section-by-section basis. Through the diagnosis process on a section-by-section basis described above, the hub device 800 can easily identify a device in trouble. Then, the hub device 800 transmits the diagnosis results to the server 500 or the operation management device 400.

The hub device 800 transmits a shutdown message to a service device in abnormal operation such that abnormality of the service device can be easily viewed from the outside. In addition, if the hub device 800 is able to directly communicate with the operation management device 400, the hub device 800 transmits an emergency message including the diagnosis results to the operation management device 400. When a ratio of the number of service devices in abnormal operation to the total number of installed service devices is greater than or equal to a predetermined reference value, the hub device 800 may transmit an emergency message including the diagnosis results to the operation management device 400.

In addition, the operation management device 400 outputs the received diagnosis results on a screen of a PC or smartphone. When the diagnosis results include information on a serious malfunction/abnormality, the operation management device 400, for example, a smartphone, may output the information in the form of a warning message.

When the diagnosis results show that a specific service device is in need of repair, the server 500 transmits information about repair schedule to the operation management device 400.

For a store in which plural smart appliances are installed to provide services, it is not easy for an operator to ascertain malfunction of individual service devices or to check network connection. According to the embodiments of the present invention, upon occurrence of problems such as malfunction or a network problem such as disconnection of the smart appliances or loss of network connection, the hub device 800 can identify a site (device) where error occurred on a section-by-section basis. That is, the hub device 800 can ascertain a problem with the Internet, a problem with a router including an access point device, a problem with a service device including a smart appliance, or a problem with an external server through diagnosis on a section-by-section basis.

In this way, a store operator can pinpoint where a problem occurred, thereby reducing service call costs and customer complaints, while improving reliability in products and services.

In addition, the server 500 can identify a device that is anticipated to fail using various diagnostic data included in the diagnosis results. Then, the server 500 can provide the operation management device 400 with information on repair schedule for the corresponding device.

Although all the elements constituting the embodiments of the present invention have been described as being combined into one or combined with one another to operate, it should be understood that the present invention is not limited thereto and at least one of the elements may be selectively combined with one another to operate. Further, all the elements may be implemented as respective independent hardware devices, but some or all of the elements may also be selectively combined and implemented in the form of a computer program having program modules which perform some or all of the functions combined by one or more hardware devices. Code and code segments constituting the computer program may be easily conceived by those skilled in the art. Such a computer program is stored in computer readable storage media and is read and executed by the computer to implement the embodiments of the present invention. Examples of the storage media for storing the computer program may include magnetic recording media, optical recording media, semiconductor recording media, and the like. In addition, the computer program for implementing the embodiments of the present invention includes a program module that is transmitted in real time via an external device.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention. The scope of the present invention should be defined by the appended claims and equivalents thereof.

What is claimed is:

1. A hub device providing a diagnostic function, comprising:
    a communication unit receiving a first type of data from plural service devices to transmit the first type of data to an access point device and receiving a second type of data from the access point device to transmit the second type of data to at least one of the service devices; and
    a controller controlling the communication unit and performing diagnosis for the service devices and the access point device in a different time schedule in each diagnostic section;
    wherein the controller performs a first-section diagnosis to check communication state of the service devices and operation state of each of the service devices, and the controller performs second-section diagnosis to check communication state between the hub device and the access point device and operation state of the access point device after performing the first-section diagnosis;
    wherein the service device is a washing machine or drying machine or clothes cleaning machine installed in a store, and the service device receives control information generated by a operation management device from the server;
    the operation management device monitors or controls the plural service devices remotely via the server or the hub device;
    the hub device transmits an emergency message including a diagnosis result to the operation management device when a ratio of a number of service devices in abnormal operation to a total number of installed service devices, among the service devices, exceeds a reference value; and
    wherein the controller generates a message instructing a specific service device to stop operation, the specific service device being a service device that is confirmed to have an abnormality in operation state or communication state based on results of the first-section diagnosis, and the communication unit transmits the message to the specific service device.

2. The hub device according to claim 1, wherein the communication unit communicates with the operation management device managing the service devices, the controller performs diagnosis for the service devices and the access point device in response to an instruction of the operation management device to generate diagnosis results, and the communication unit transmits the diagnosis results to the operation management device.

3. The hub device according to claim 1, wherein the communication unit communicates with a server via the access point device, the controller performs diagnosis for the service devices and the access point device in response to an instruction of the server to generate diagnosis results, and the communication unit transmits the diagnosis results to the server.

4. The hub device according to claim 1, wherein the controller selects a service device that has never transmitted data or a service device that has higher data traffic than other service devices among the service devices, and performs the first-section diagnosis for the selected service device.

5. The hub device according to claim 1, wherein the controller performs a third-section diagnosis to check connection state of the hub device to an external public server and the Internet via the access point device, and the controller performs a fourth-section diagnosis to check communication state between the hub device and a server and operation state of the server via the access point device after performing the third-section diagnosis.

6. A method of performing a diagnostic function by a hub device, the hub device comprising: a communication unit directly communicating with plural service devices and an access point device; and a controller controlling the communication unit, the method comprising:
performing, by the controller, a first-section diagnosis to check communication state between the hub device and each of the service devices and operation state of each of the service devices;
performing, by the controller, a second-section diagnosis to check communication state between the hub device and the access point device and operation state of the access point device;
performing, by the controller, a third-section diagnosis to check connection state of the hub device to an external public server and the Internet via the access point device; and
performing, by the controller, a fourth-section diagnosis to check communication state between the hub device and a server and operation of the server via the access point device;
wherein the controller performs diagnosis in each diagnostic section with a different time schedule;
wherein the service device is a washing machine or drying machine or clothes cleaning machine installed in a store, and the service device receives control information generated by a operation management device from the server;
the operation management device monitors or controls the plural service devices remotely via the server or the hub device;
the hub device transmits an emergency message including a diagnosis result to the operation management device when a ratio of a number of service devices in abnormal operation to a total number of installed service devices, among the service devices, exceeds a reference value;
generating, by the controller, a message instructing a specific service device to stop operation, the specific service device being a service device that is confirmed to have an abnormality in communication state or operation state based on results of the first-section diagnosis; and
transmitting, by the communication unit, the message to the specific service device.

7. The method according to claim 6, wherein the communication unit communicates with the operation management device managing the service devices,
the method further comprising:
generating, by the controller, diagnosis results by performing diagnosis for the service devices and the access point device in response to an instruction of the operation management device; and
transmitting, by the communication unit, the diagnosis results to the operation management device.

8. The method according to claim 6, wherein the communication unit communicates with the server via the access point device,
the method further comprising:
generating, by the controller, diagnosis results by performing diagnosis for the service devices and the access point device in response to an instruction of the server; and
transmitting, by the communication unit, the diagnosis results to the server.

9. The method according to claim 6, further comprising:
selecting, by the controller, a service device that has never transmitted data or a service device that has higher data traffic than other service devices among the service devices.

* * * * *